United States Patent
Whitman et al.

(10) Patent No.: US 11,711,860 B2
(45) Date of Patent: Jul. 25, 2023

(54) DEVICE PAIRING BY COGNITIVE COMPUTING

(71) Applicant: KYNDRYL, INC., New York, NY (US)

(72) Inventors: Todd Russell Whitman, Bethany, CT (US); Mauro Marzorati, Lutz, FL (US); Jeremy R. Fox, Georgetown, TX (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 269 days.

(21) Appl. No.: 17/303,719

(22) Filed: Jun. 6, 2021

(65) Prior Publication Data
US 2022/0394788 A1 Dec. 8, 2022

(51) Int. Cl.
| H04B 7/00 | (2006.01) |
| H04W 76/14 | (2018.01) |
| H04L 41/08 | (2022.01) |
| G06T 11/00 | (2006.01) |
| G06F 3/01 | (2006.01) |

(52) U.S. Cl.
CPC ............ *H04W 76/14* (2018.02); *G06F 3/013* (2013.01); *G06T 11/00* (2013.01); *H04L 41/0883* (2013.01)

(58) Field of Classification Search
CPC ........ H04W 76/14; G06F 3/013; G06T 11/00; H04L 41/0883
USPC ....................................................... 455/41.2
See application file for complete search history.

(56) References Cited

U.S. PATENT DOCUMENTS

| 7,173,604 | B2 |  | 2/2007 | Marvit |  |
| 9,048,923 | B2 | * | 6/2015 | Molettiere | ............ H04W 12/33 |
| 9,529,439 | B2 | * | 12/2016 | Van Dyken | ............. H04W 4/21 |
| 10,031,650 | B1 | * | 7/2018 | Bastide | ................... G06F 3/013 |

(Continued)

FOREIGN PATENT DOCUMENTS

WO 2015034560 A1 3/2015

OTHER PUBLICATIONS

Mell, et al., "The NIST Definition of Cloud Computing", National Institute of Standards and Technology, Special Publication 800-145, Sep. 2011, 7 pages.

(Continued)

*Primary Examiner* — April G Gonzales
(74) *Attorney, Agent, or Firm* — Dan Housley; Andrew M. Calderon; Calderon Safran & Cole P.C

(57) ABSTRACT

A computer-implemented method and a computer program product for device pairing by cognitive computing. A cognitive computing system creates a knowledge corpus about the historical activities of pairing devices of a user. The cognitive computing system predicts needs of device pairing of the user, based on analysis of the historical activities. The cognitive computing system identifies devices that can be paired in a surrounding area. An augmented reality device tracks an eye direction of the user at a device, extrapolates the eye direction to create an eye focus direction of the user, obtains from the cognitive computing system an eye focus line with an arrow pointing to the device, and creates an augmented reality overlay which shows the eye focus line. The augmented reality device pairs a user currently used device and the device, upon user approval.

20 Claims, 7 Drawing Sheets

(56) References Cited

U.S. PATENT DOCUMENTS

| | | | |
|---|---|---|---|
| 10,212,723 B2* | 2/2019 | Jiang | H04L 5/0005 |
| 10,448,080 B1* | 10/2019 | Nijim | H04N 21/6131 |
| 10,660,148 B1* | 5/2020 | Alameh | H04W 4/80 |
| 10,778,829 B2* | 9/2020 | Thompson | H04M 1/72412 |
| 11,631,416 B1* | 4/2023 | Childress | G10L 25/51 |
| | | | 381/56 |
| 2016/0330711 A1* | 11/2016 | Thorson | H04W 68/005 |
| 2017/0006141 A1* | 1/2017 | Bhadra | H04W 4/70 |
| 2020/0128594 A1* | 4/2020 | Shantharam | H04L 67/51 |
| 2020/0329517 A1* | 10/2020 | Mcclellan | H04W 76/11 |
| 2020/0382930 A1* | 12/2020 | Zheng | H04W 52/383 |
| 2021/0058488 A1* | 2/2021 | Pham | H04L 67/34 |
| 2021/0092784 A1* | 3/2021 | Blum | H04W 12/50 |
| 2021/0385067 A1* | 12/2021 | Yarabolu | G06F 3/0346 |

OTHER PUBLICATIONS

Miettinen, et al., "Context-Based Zero-Interaction Pairing and Key Evolution for Advanced Personal Devices", CCS 2014, 12 pages.

Peng, et al., "Point&Connect: Intention-based Device Pairing for Mobile Phone Users", Proceedings of the 7th International conference on Mobile systems, applications, and services, Jun. 2009, 14 pages, <https://dl.acm.org/doi/10.1145/1555816.1555831>.

Saxena, et al., "Secure Pairing of 'Interface-Constrained' Devices Resistant against Rushing User Behavior", ACNS 2009, pp. 34-42.

Song, et al., "Stable Device Pairing for Collaborative Data Dissemination with Device-to-Device Communications", IEEE Internet of Things Journal, vol. 5, Issue: 2, Apr. 2018, 14 pages, <https://ieeexplore.ieee.org/document/8278154>.

Zhang, et al., "Tap-to-Pair: Associating Wireless Devices with Synchronous Tapping", Proceedings of the ACM Interactive Mobile Wearable Ubiquitous Technology, vol. 2, No. 4, Article 201, Dec. 2018, 21 pages.

* cited by examiner

DEVICE PAIRING BY COGNITIVE COMPUTING

BACKGROUND

The present invention relates generally to pairing devices, and more particularly to device pairing by cognitive computing.

In many situations, users need to pair various devices for different types of computing activities. When the devices are paired, the devices can share information with each other, share resources, and perform various computing activities. Head-mounted augmented reality devices create digital content in front of the user's field of vision and project digital content on eye retinas.

Pairing of devices requires sending a request to and accepting a request from each device before the devices are paired. Pairing of devices is only possible if the devices are within the connectivity range. For example, a user pairing the devices must know Bluetooth names of the devices and know which to select for an intended purpose. In addition, previously paired devices may connect erroneously and pairing does not match the intention of a user. For instance, a Bluetooth headset, which has been paired to a user's computer, phone, and TV, may connect to the user's computer or TV but the user's intent is to connect to the user's phone at the time of use.

SUMMARY

A computer-implemented method for device pairing by cognitive computing is provided. The computer-implemented method includes obtaining, by a computer, information about historical activities of pairing devices of a user and types of the historical activities; creating, by the computer, a knowledge corpus about the historical activities, based on the information about the historical activities and classification of the historical activities; predicting, by the computer, needs of device pairing of the user, based on analysis of the historical activities; identifying, by the computer, types and specifications of devices in a surrounding area; identifying, by the computer, appropriate devices that can be paired in the surrounding area; communicating, by the computer, with an augmented reality device of the user, about information of the appropriate devices; and wherein the augmented reality device pairs the appropriate devices in the surrounding area.

A computer-implemented method for device pairing by cognitive computing is provided. The computer-implemented method includes tracking, by an augmented reality device, a user eye direction toward a device; extrapolating, by the augmented reality device, the user eye direction, to create an eye focus direction of the user; communicating with a cognitive computing system, by the augmented reality device, such that the cognitive computing system obtains the eye focus direction; obtaining from the cognitive computing system, by the augmented reality device, an eye focus line with an arrow pointing to the device, wherein the eye focus line is created by the cognitive computing system based on the eye focus direction; creating, by the augmented reality device, an augmented reality overlay to show user the eye focus line; determining, by the augmented reality device, whether the user approves pairing a user currently used device and the device; and pairing, by the augmented reality device, the user currently used device and the device, in response to determining that the user approves paring the user currently used device and the one of the devices.

A computer program product for device pairing by cognitive computing is provided. The computer program product comprises a computer readable storage medium having program instructions embodied therewith, and the program instructions are executable by one or more processors. The program instructions are executable to track, by an augmented reality device, a user eye direction toward a device. The program instructions are further executable to extrapolate, by the augmented reality device, the user eye direction, to create an eye focus direction of the user. The program instructions are further executable to communicate with a cognitive computing system, by the augmented reality device, such that the cognitive computing system obtains the eye focus direction. The program instructions are further executable to obtain from the cognitive computing system, by the augmented reality device, an eye focus line with an arrow pointing to the device, wherein the eye focus line is created by the cognitive computing system based on the eye focus direction. The program instructions are further executable to create, by the augmented reality device, an augmented reality overlay to show the user the eye focus line. The program instructions are further executable to determine, by the augmented reality device, whether the user approves pairing a user currently used device and the device. The program instructions are further executable to pair, by the augmented reality device, the user currently used device and the device, in response to determining that the user approves paring the user currently used device and the one of the devices.

DETAILED DESCRIPTION

Figure 1:
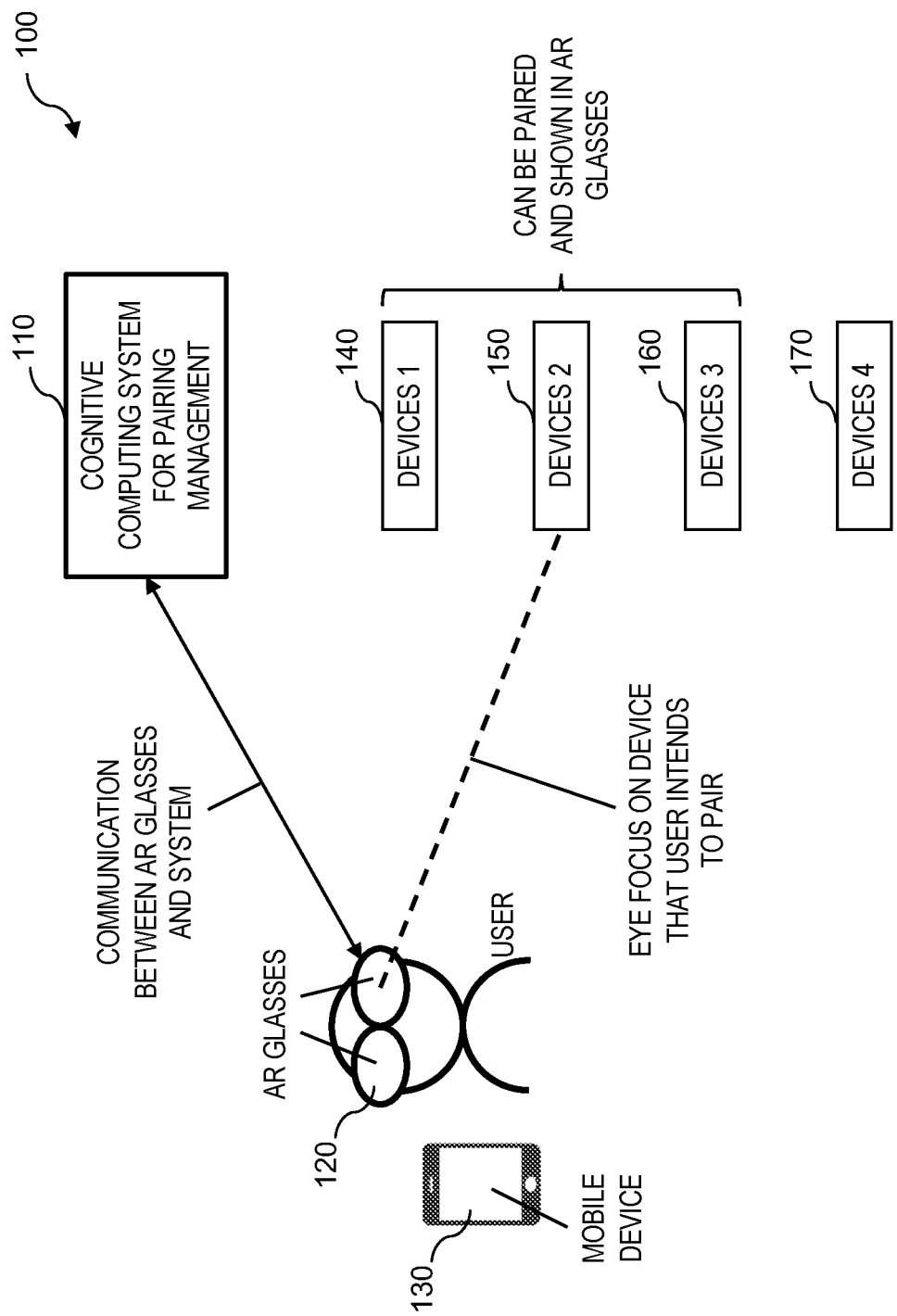
FIG. 1 is a systematic diagram illustrating a system for device pairing by cognitive computing, in accordance with one embodiment of the present invention.

Embodiments of the present invention propose a method and system of using cognitive computing to predict a user's device pairing need and the purpose of device pairing. Embodiments of the present invention correlate the device pairing need and the purpose of device pairing, based on an eye focus on a target device or a range of devices within an eye focus range. An augmented reality (AR) device (such as AR glasses) tracks a user's primary focus direction then selectively identify one or more devices within the field of vision to pair devices.

Embodiments of the present invention provide a user-friendly device pairing mechanism. The user-friendly device pairing mechanism matches a user's inferred intent for device use, so that a user can quickly and accurately pair devices based on the user's intended need.

By analyzing user's activities, eye gaze, and physical gesture with one or more analytic devices and computing systems, the proposed system of the present invention will predict a user's activity, intent, and specific device pairing need. The proposed system of the present invention automatically pair devices to associate activities and needs with device pairing, based on the inferred activity, eye focus, and one or more available identified target devices.

The proposed system of the present invention predict whether multiple devices are in need to be paired with a user's current device for a given activity, and an augmented reality (AR) device visually shows devices that are present in a visual surrounding, so that the user can quickly look at one or more devices which are to be paired. For example, using an AR device, a user can look at any connectable device within connectivity range. Through cognitive computing, the proposed system provides a recommendation to pair one or more target devices with a current device, when the user is looking at the one or more target devices.

In embodiments of the present invention, using an eye tracking method of an AR device, a user can select a defined area in a visual surrounding; with eye gestures, one or more device present inside the defined area will be automatically paired with the user's current device.

In embodiments of the present invention, when devices are pairing with each other within a visual surrounding, an AR device creates appropriate visualization to explain which one or more devices are paired with a user's current device. With a gesture (i.e., finger) interaction and with a visual indication, the user can unpair the one or more devices.

In embodiments of the present invention, an AR device displays the purpose of device pairing. The AR device displays whether one or more devices are paired to share power, computing resources, information, or signals. Using the AR device, a user can apply one or more filters while creating device to device pairing and, at the same time, pairing down unwanted pairing combinations.

In embodiments of the present invention, using an AR device, a user can look at any device in the surrounding apart from cognitive computing recommendation. When using an AR device, a user may close one or both of eyes and accordingly the user can prevent pairing user's current device with a device where the user was just looking at.

FIG. 1 is a systematic diagram illustrating system 100 for device pairing by cognitive computing, in accordance with one embodiment of the present invention. System 100 includes cognitive computing system 110 for pairing management. Cognitive computing system 110 may be implemented on one or more computing devices or servers. A computing device or server is described in more detail in later paragraphs with reference to FIG. 4. System 110 may be implemented in a cloud computing environment. The cloud computing environment is described in more detail in later paragraphs with reference to FIG. 5 and FIG. 6.

System 100 further includes an augmented reality (AR) device, particularly AR glasses 120 in the embodiment shown in FIG. 1. Cognitive computing system 110 and AR glasses 120 communicate with each other. The communication between cognitive computing system 110 and AR glasses 120 is through a device compatible network, such as WI-FI®, near-field communication (NFC), BLUETOOTH®, 5G (5th generation mobile network), and radio frequency (RF).

System 100 further includes multiple devices in a visual surrounding near a user. For the purpose of illustration, FIG. 1 shows device 1 140, device 2 150, device 3 160, and device 4 170. In system 100, mobile device 130 is a current device used by the user and is to be paired with the multiple devices; for example, mobile device 130 may be a mobile phone. Cognitive computing system 110 predicts needs of the user and identifies appropriate devices which can be paired with mobile device 130; in the example shown in FIG. 1, cognitive computing system 110 identifies that device 1 140, device 2 150, and device 3 160 can be paired. The devices which can be paired, such as device 1 140, device 2 150, and device 3 160, are shown in AR glasses 120.

Cognitive computing system 110 gathers information about user's historical multi-device activities; for example, the information about user's multi-device activities includes how the user pairs various devices. Cognitive computing system 110 also gathers information about what types of activities the user performs; for example, the types of activities include information sharing and computing resource sharing. Cognitive computing system 110 classifies user's historical multi-device activities, based on the information about what types of activities the user performs. Cognitive computing system 110 creates a knowledge corpus about the historical activities and user needs of device pairing, based on the gathered information mentioned above and the classification of the user's historical multi-device activities.

Cognitive computing system 110 analyzes the user's historical multi-device activities, and cognitive computing system 110 predicts needs (or requirements) of user's device pairing and what types of devices are to be paired. Cognitive computing system 110 identifies the types of the devices and specifications of the devices. As shown in FIG. 1, in the surrounding area, there are device 1 140, device 2 150, device 3 160, and device 4 170. Cognitive computing system 110 is capable of predicting which devices will be required by the user and are in the surrounding area. Based on the prediction of needs (or requirements) of user's device pairing, cognitive computing system 110 identifies appropriate devices which can be paired. As shown in FIG. 1, in the surrounding area, device 1 140, device 2 150, and device 3 160 are the appropriate devices which can be paired.

Using an indoor positioning system, cognitive computing system 110 identifies relative positions of the devices. Cognitive computing system 110 communicates with AR glasses 120 about positions of the devices which can be paired with a user's current device. AR glasses 120 gets details about these devices present in the surrounding. AR glasses 120 shows the user the positions of these devices.

The user wears head mounted AR glasses 120, and head mounted AR glasses 120 track user's eye direction. Based on the identified eye direction, AR glasses 120 extrapolates the eye direction and creates an eye focus direction. For example, as shown in FIG. 1, eye focus direction toward device 2 150 is created when the user's eye direction is toward device 2 150.

Cognitive computing system 110 creates an eye focus line with an arrow pointing to the one of the appropriate devices (e.g., device 2 150 shown in FIG. 1), based on the eye focus direction. AR glasses 120 creates an augmented reality overlay, showing the eye focus line which has been created by cognitive computing system 110. Receiving from cognitive computing system the eye focus line, AR glasses 120 creates the appropriate visualization and shows an eye contact direction (or the eye focus line).

Using AR glasses 120, the user can focus on the device (e.g., device 2 150 shown in FIG. 1) for a certain time period. When the time period exceeds a predetermined threshold, AR glasses 120 determines that the user approves the device pairing Alternatively, AR glasses 120 determines that the user approves the device pairing, based on a gesture of the user. In response to determining that the user approves the device pairing, AR glasses 120 pairs a device being current used by the user (e.g., mobile device 130) and the one of the appropriate devices (e.g., device 2 150).

In other embodiments, cognitive computing system 110 and AR glasses 120 create a boundary in the visual surrounding area, based on an eye movement pattern of the user. Once the boundary is created, cognitive computing system 110 and AR glasses 120 identify devices present within the boundary and pair these devices with a device being current used by the user.

Figure 2:
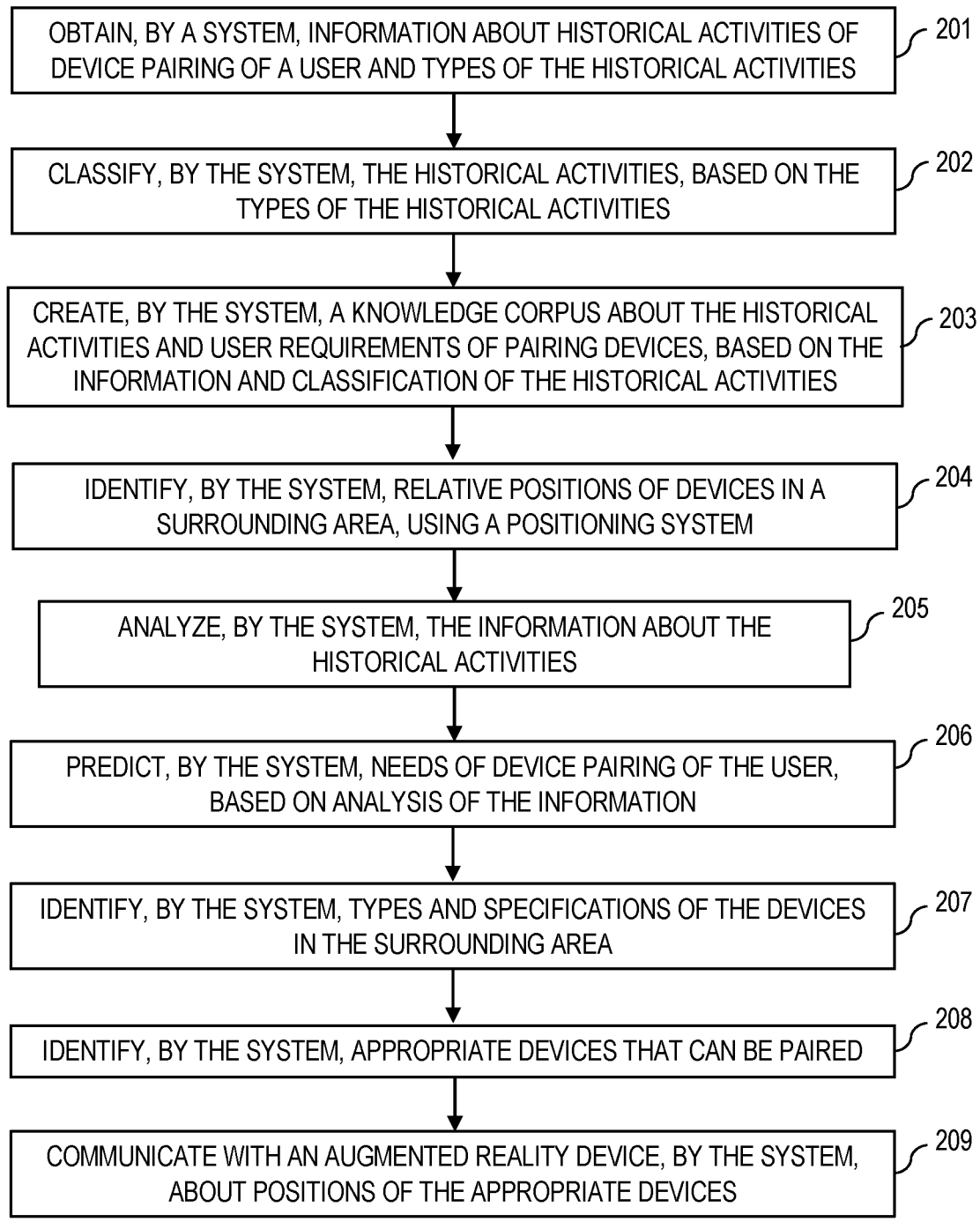
FIG. 2 presents a flowchart showing operational steps of predicting user needs of device pairing and identifying appropriate devices that can be paired, in accordance with one embodiment of the present invention.

FIG. 2 presents a flowchart showing operational steps of predicting user needs of device pairing and identifying appropriate devices that can be paired, in accordance with one embodiment of the present invention. The operational steps are executed by a cognitive computing system (e.g., cognitive computing system 110 shown in FIG. 1) which may hosted by a computing device or server. The computing device or server may be in a cloud computing environment.

At step 201, the cognitive computing system obtains information about historical activities of pairing devices of a user and types of the historical activities. The historical activities have been performed by the user for information sharing and/or computing resource sharing. At step 202, the cognitive computing system classifies the historical activities, based on the types of the historical activities.

At step 203, the cognitive computing system creates a knowledge corpus about the historical activities and user requirements of pairing devices, based on the obtained information and classification of the historical activities. The knowledge corpus will be used by the cognitive computing system for predicting user needs of device pairing and identifying appropriate devices that can be paired.

At step 204, the cognitive computing system identifies relative positions of devices in a surrounding area, using a positioning system. In the surrounding area, there are multiple devices which may be paired with a device currently used by the user.

At step 205, the cognitive computing system analyzes the information about the historical activities which is obtained at step 201 and stored in the knowledge corpus created at step 203. At step 206, the cognitive computing system predicts needs of device pairing of the user, based on the analysis at step 205.

At step 207, the cognitive computing system identifies types and specifications of the devices in the surrounding area. Based on the types and the specifications of the devices in the surrounding area and based on the needs of device pairing by the user, at step 208, the cognitive computing system identifies appropriate devices that can be paired in the surrounding area. The appropriate devices meet the needs of device pairing by the user.

At step 209, the cognitive computing system communicates with an augmented reality (AR) device about the positions of the appropriate devices. In the example shown in FIG. 1, the AR device is AR glasses 120. The positions of the appropriate devices will be used for paring devices; the operational steps for paring devices will be discussed in later paragraphs with reference to FIG. 3(A) and FIG. 3(B).

Figure 3A:
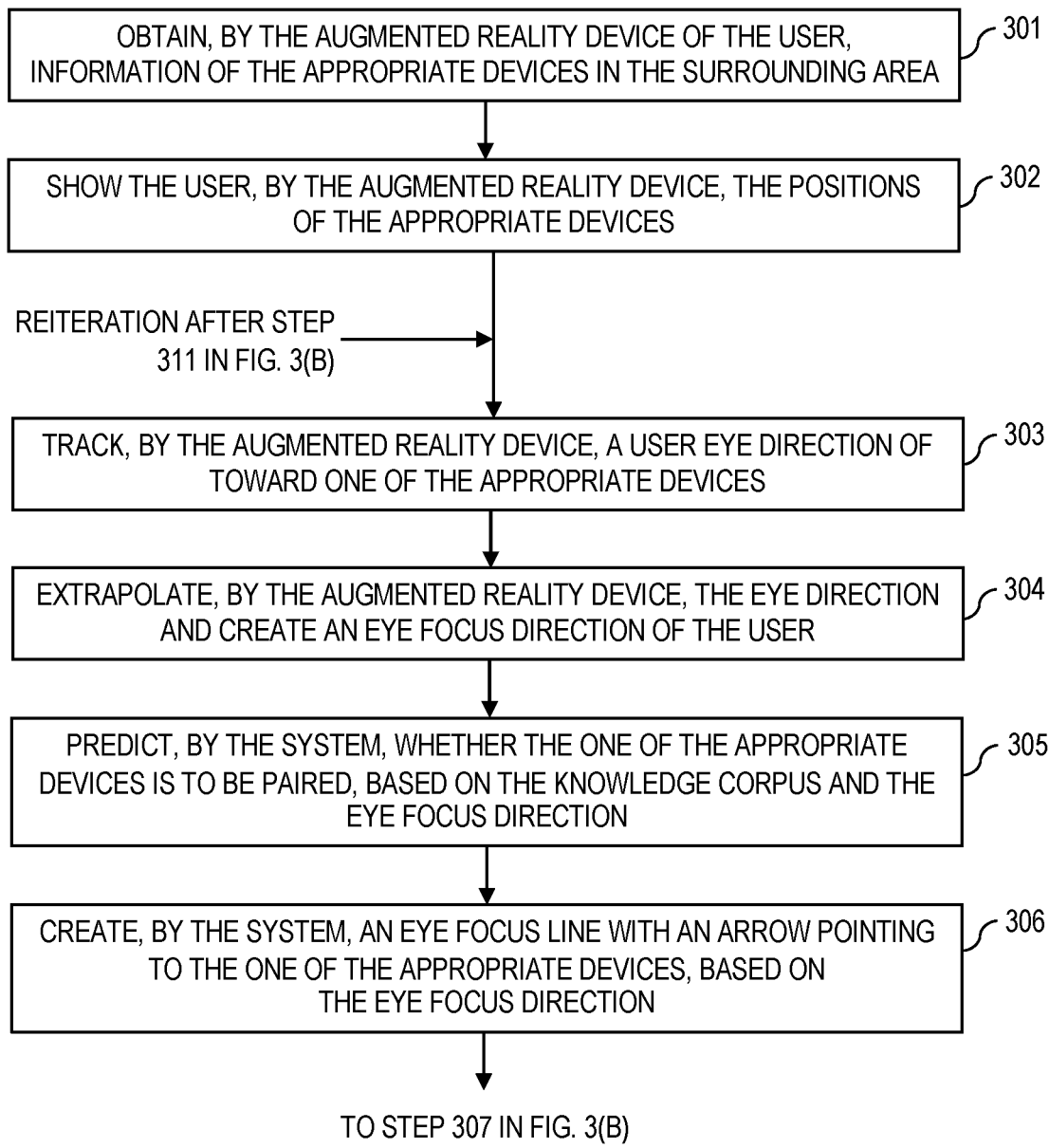
FIG. 3(A) and FIG. 3(B) present a flowchart showing operational steps of paring devices by cognitive computing, in accordance with one embodiment of the present invention.
Figure 3B:
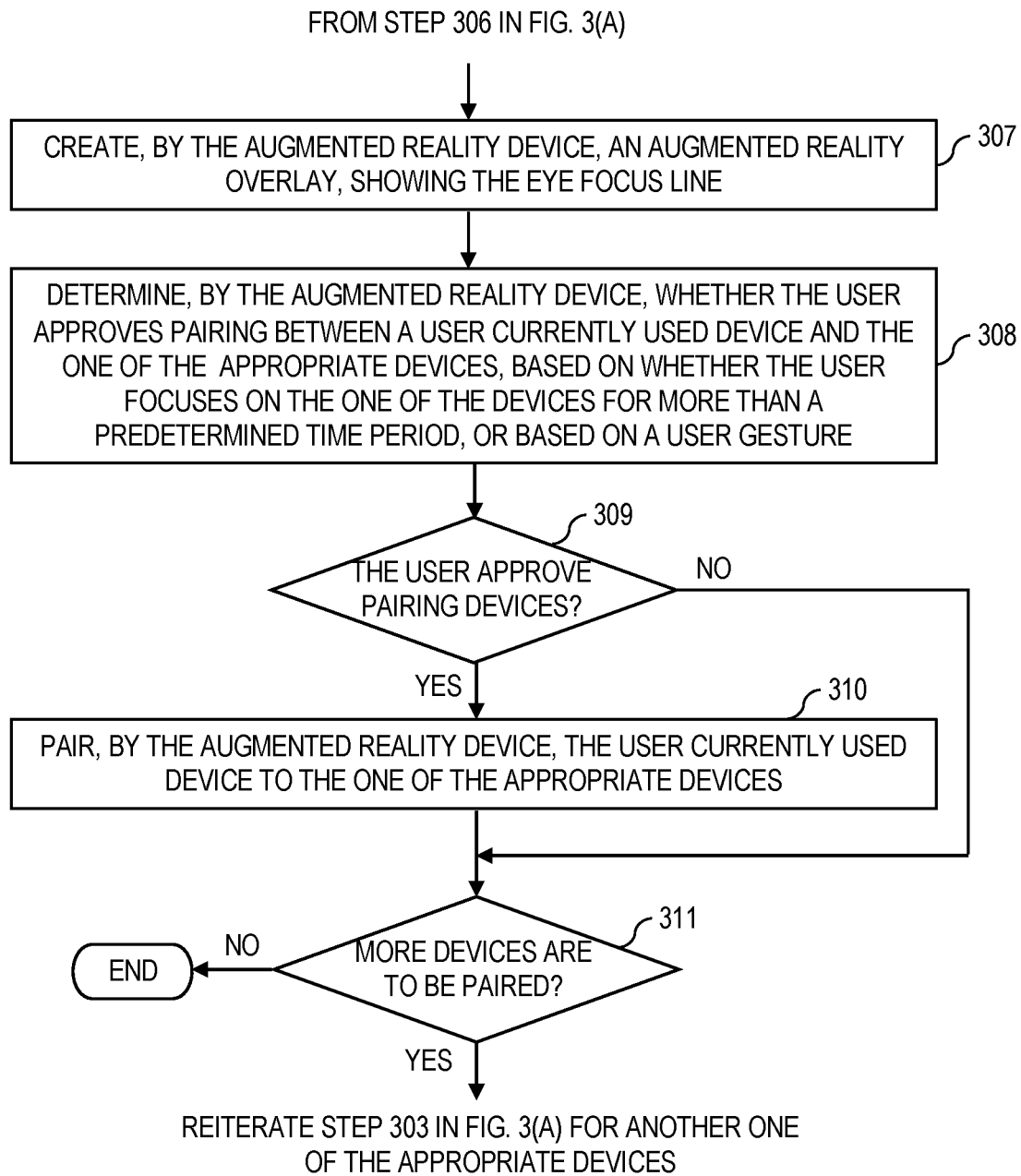

FIG. 3(A) and FIG. 3(B) present a flowchart showing operational steps of paring devices by cognitive computing, in accordance with one embodiment of the present invention. Some of the operational steps are executed by the cognitive computing system (e.g., cognitive computing system 110 shown in FIG. 1), while other operational steps are executed by the AR device (e.g., AR glasses 120 shown in FIG. 1). The cognitive computing system may be hosted by a computing device or server, and the computing device or server may be in a cloud computing environment. The AR device has a processor, display, sensors, and input devices; the AR device has a computing capability and can communicate with the cognitive computing system through a device compatible network.

Referring to FIG. 3(A), at step 301, the augmented reality (AR) device of the user obtains information of the appropriate devices in the surrounding area. The appropriate devices has been identified by the cognitive computing system at step 208 shown in FIG. 2. The AR device gets details about the appropriate devices present in the surrounding area. The information of the appropriate devices includes the positions of the appropriate devices in the surrounding area. At step 302, the augmented reality (AR) device shows the user the positions of the appropriate devices.

Referring to FIG. 3(A), at step 303, the augmented reality (AR) device tracks a user eye direction toward one of the appropriate devices. When the user intends to pair user's currently used device, the user looks at the one of the appropriate devices; the eye direction of the user is captured by the AR device. At step 304, the augmented reality (AR) device extrapolates the eye direction and creates an eye focus direction of the user. The created eye focus direction of the user is obtained by the cognitive computing system through communication between the cognitive computing system and the augmented reality (AR) device.

Referring to FIG. 3(A), at step 305, the cognitive computing system predicts whether the one of the appropriate devices is to be paired, based on the knowledge corpus (created by the cognitive computing system at step 203 shown in FIG. 2) and the eye focus direction (created by the AR device at step 304). In response to determining that the one of the appropriate devices is to be paired, at step 306, the cognitive computing system creates an eye focus line with an arrow pointing to the one of the appropriate devices, based on the eye focus direction. The created eye focus line is obtained by the augmented reality (AR) device through communication between the cognitive computing system and the augmented reality (AR) device. The cognitive computing system may send the created eye focus line to the augmented reality (AR) device.

Now, referring to FIG. 3(B), at step 307, the augmented reality (AR) device creates an augmented reality overlay, showing the eye focus line which is created by the cognitive computing system at step 306. The visualization created by the AR device shows the user that the one of the appropriate devices is going to be paired and prompts the user to approve or disapprove pairing the user currently used device and the one of the appropriate devices.

Referring to FIG. 3(B), at step 308, the augmented reality (AR) device determines whether the user approves pairing the user currently used device and the one of the appropriate devices, based on whether the user focuses on the one of the devices for more than a predetermined time period, or based on a user gesture. In one embodiment, in response to that the time period of focusing on the one of the devices exceeds the predetermined time period, the AR device determines that the user approves pairing the user currently used device and the one of the appropriate devices. In another embodiment, a certain gesture from the user may indicate that the user approves device pairing.

Referring to FIG. 3(B), in response to determining that the user approves pairing the user currently used device and the one of the appropriate devices (YES branch of decision block 309), at step 310, the augmented reality (AR) device pairs the user currently used device and the one of the appropriate devices. Then, step 311 is executed. In response to determining that the user does not approve pairing the user currently used device and the one of the appropriate devices (NO branch of decision block 309), step 311 is executed.

Referring to FIG. 3(B), at step 311, the augmented reality (AR) device determines whether another one of the appropriate devices is to be paired. The AR device makes the decision by determining whether the user focuses on another one of the appropriate devices. If the user focuses on another one of the appropriate devices, it is indicated that another one of the appropriate devices is to be paired.

Referring to FIG. 3(B), in response to determining that none of the appropriate devices is to be paired (NO branch of decision block 311), the operational steps are terminated. In response to determining that another one of the appropriate devices is to be paired (YES branch of decision block 311), the augmented reality (AR) device reiterates step 303 in FIG. 3(A) for another one of the appropriate devices.

Figure 4:
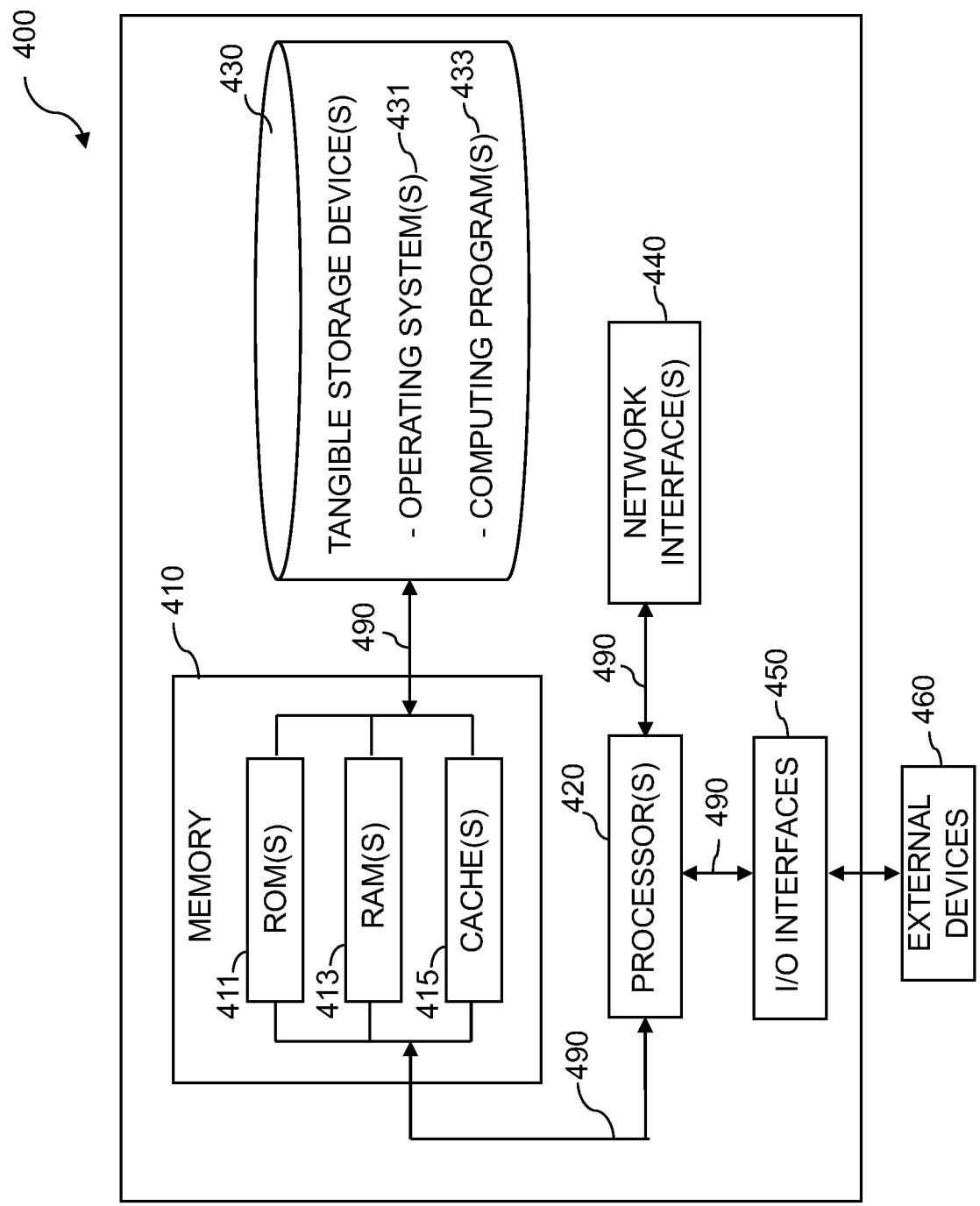
FIG. 4 is a diagram illustrating components of a computing device or server, in accordance with one embodiment of the present invention.

FIG. 4 is a diagram illustrating components of computing device or server 400, in accordance with one embodiment of the present invention. It should be appreciated that FIG. 4 provides only an illustration of one implementation and does not imply any limitations with regard to the environment in which different embodiments may be implemented.

Referring to FIG. 4, computing device or server 400 includes processor(s) 420, memory 410, and tangible storage device(s) 430. In FIG. 4, communications among the above-mentioned components of computing device or server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device or server 400 further includes I/O interface(s) 450. I/O interface(s) 450 allows for input and output of data with external device(s) 460 that may be connected to computing device or server 400. Computing device or server 400 further includes network interface(s) 440 for communications between computing device or server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
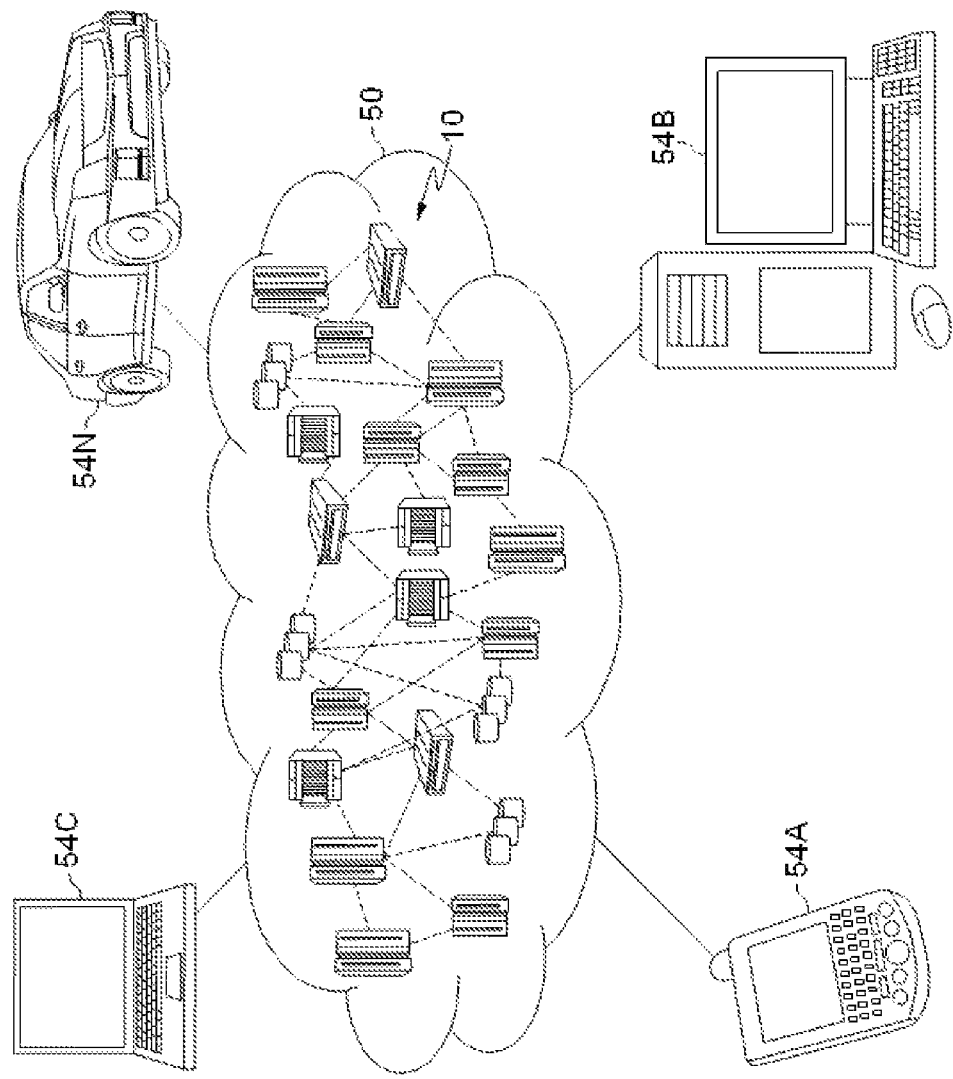
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
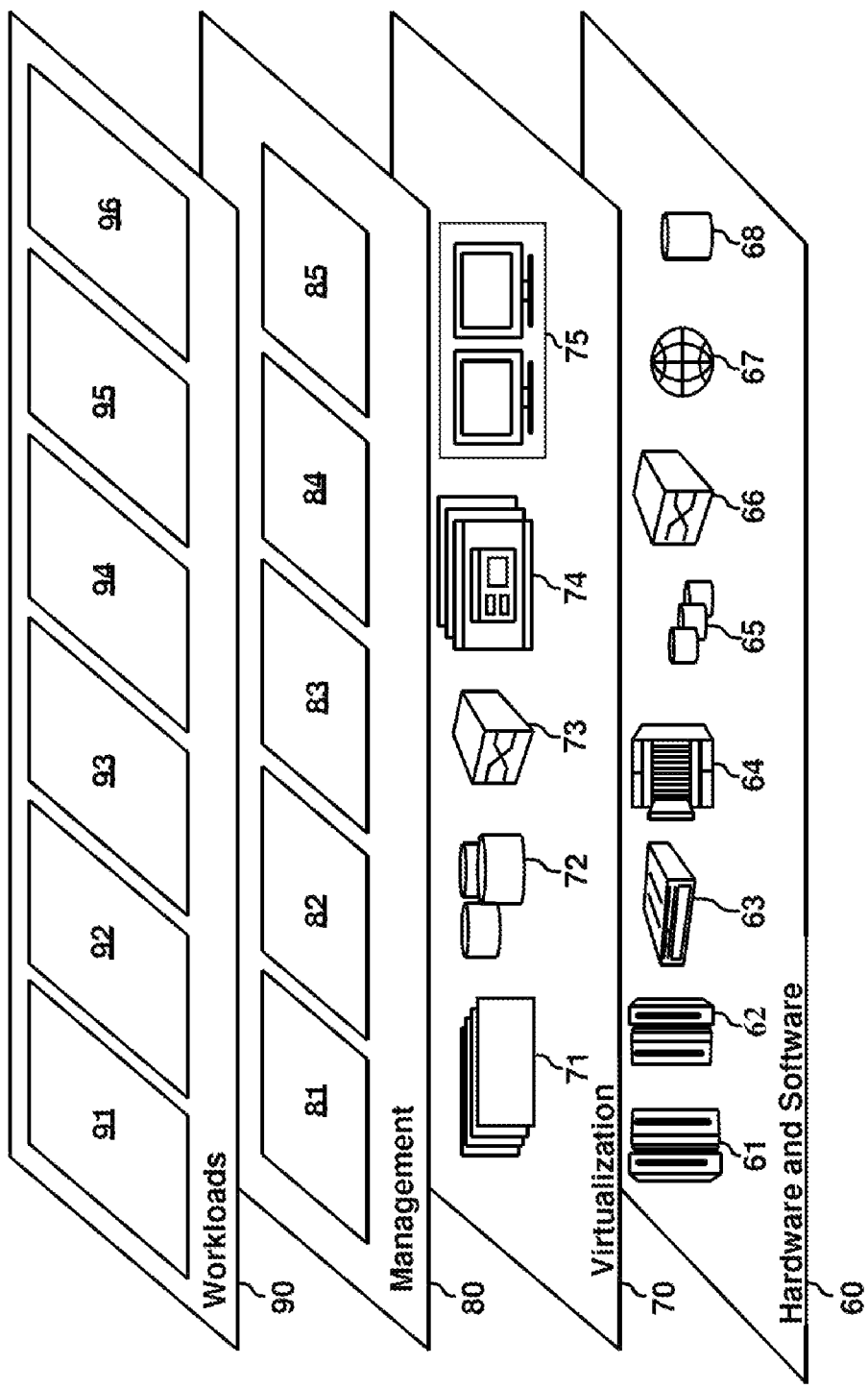
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of device pairing by cognitive computing.

What is claimed is:

1. A computer-implemented method for device pairing by cognitive computing, the method comprising:
    obtaining, by a computer, information about historical activities of pairing devices of a user and types of the historical activities;
    creating, by the computer, a knowledge corpus about the historical activities, based on the information about the historical activities and classification of the historical activities;
    predicting, by the computer, needs of device pairing of the user, based on analysis of the historical activities;
    identifying, by the computer, types and specifications of devices in a surrounding area;
    identifying, by the computer, appropriate devices that can be paired in the surrounding area;
    communicating, by the computer, with an augmented reality device of the user, about information of the appropriate devices; and
    wherein the augmented reality device pairs the appropriate devices in the surrounding area.

2. The computer-implemented method of claim 1, further comprising:
    classifying, by the computer, the historical activities, based on types of the historical activities.

3. The computer-implemented method of claim 1, further comprising:
    identify, by the computer, relative positions of the devices in the surrounding area, using a positioning system; and
    communicating, by the computer, with the augmented reality device of a user, about the relative positions.

4. The computer-implemented method of claim 1, further comprising:
    in response to the augmented reality device capturing a user eye direction toward one of the appropriate devices and creating an eye focus direction of the user, obtaining from the augmented reality device, by the computer, the eye focus direction;
    predicting, by the computer, whether the one of the appropriate devices is to be paired by the user, based on the knowledge corpus and the eye focus direction; and
    creating, by the computer, an eye focus line with an arrow pointing to the one of the appropriate devices, based on the eye focus direction.

5. The computer-implemented method of claim 4, further comprising:
    sending to the augmented reality device, by the computer, the eye focus line; and
    wherein the augmented reality device creates an augmented reality overlay, showing the user the eye focus line on the augmented reality device and prompting the user to approve or disapprove pairing a user currently used device and the one of the appropriate devices.

6. The computer-implemented method of claim 5, further comprising:
    determining, by the augmented reality device, whether the user approves pairing between the user currently used device and the one of the appropriate devices;
    in response to approval of the user, pairing, by the augmented reality device, the user currently used device and the one of the appropriate devices.

7. A computer-implemented method for device pairing by cognitive computing, the method comprising:
    tracking, by an augmented reality device, a user eye direction toward a device;
    extrapolating, by the augmented reality device, the user eye direction, to create an eye focus direction of the user;
    communicating with a cognitive computing system, by the augmented reality device, such that the cognitive computing system obtains the eye focus direction;
    obtaining from the cognitive computing system, by the augmented reality device, an eye focus line with an arrow pointing to the device, wherein the eye focus line is created by the cognitive computing system based on the eye focus direction;
    creating, by the augmented reality device, an augmented reality overlay to show the user the eye focus line;
    determining, by the augmented reality device, whether the user approves pairing a user currently used device and the device; and
    pairing, by the augmented reality device, the user currently used device and the device, in response to determining that the user approves paring the user currently used device and the device.

8. The computer-implemented method of claim 7, further comprising:
    in response to determining that the user focuses on the device for more than a predetermined time period, determining, by the augmented reality device, that the user approves paring the user currently used device and the device.

9. The computer-implemented method of claim 7, further comprising:
    in response to receiving from the user a gesture of approval, determining, by the augmented reality device, that the user approves paring the user currently used device and the device.

10. The computer-implemented method of claim 7, further comprising:
    obtaining from the cognitive computing system, by the augmented reality device, information about the device, the information of the device including a position of the device; and
    showing the user, by the augmented reality device, the position of the device.

11. The computer-implemented method of claim 7, further comprising:
    showing, by the augmented reality device, the user the eye focus line on the augmented reality device; and
    prompting, by the augmented reality device, the user to approve or disapprove pairing the user currently used device and the device.

12. The computer-implemented method of claim 7, further comprising:
    predicting, by the cognitive computing system, whether the device is to be paired, based on a knowledge corpus about historical activities of pairing devices of the user and the eye focus direction.

13. The computer-implemented method of claim 12, further comprising:
    obtaining, by the cognitive computing system, information about the historical activities and types of the historical activities;
    creating, by the cognitive computing system, the knowledge corpus, based on the information about the historical activities and classification of the historical activities.

14. A computer program product for device pairing by cognitive computing, the computer program product comprising a computer readable storage medium having program instructions embodied therewith, the program instructions executable by one or more processors, the program instructions executable to:
    track, by an augmented reality device, a user eye direction toward a device;
    extrapolate, by the augmented reality device, the user eye direction, to create an eye focus direction of the user;
    communicate with a cognitive computing system, by the augmented reality device, such that the cognitive computing system obtains the eye focus direction;
    obtain from the cognitive computing system, by the augmented reality device, an eye focus line with an arrow pointing to the device, wherein the eye focus line is created by the cognitive computing system based on the eye focus direction;
    create, by the augmented reality device, an augmented reality overlay to show the user the eye focus line;
    determine, by the augmented reality device, whether the user approves pairing a user currently used device and the device;
    pair, by the augmented reality device, the user currently used device and the device, in response to determining that the user approves paring the user currently used device and the device.

15. The computer program product of claim 14, further comprising the program instructions executable to:
    in response to determining that the user focuses on the device for more than a predetermined time period, determine, by the augmented reality device, that the user approves paring the user currently used device and the device.

16. The computer program product of claim 14, further comprising the program instructions executable to:
    in response to receiving from the user a gesture of approval, determine, by the augmented reality device, that the user approves paring the user currently used device and the device.

17. The computer program product of claim 14, further comprising the program instructions executable to:
    obtain from the cognitive computing system, by the augmented reality device, information about the device, the information of the device including a position of the device; and
    show the user, by the augmented reality device, the position of the device.

18. The computer program product of claim 14, further comprising the program instructions executable to:
    show, by the augmented reality device, the user the eye focus line on the augmented reality device; and
    prompt, by the augmented reality device, the user to approve or disapprove pairing the user currently used device and the device.

19. The computer program product of claim 14, further comprising the program instructions executable to:

predict, by the cognitive computing system, whether the device is to be paired, based on a knowledge corpus about historical activities of pairing devices of the user and the eye focus direction.

20. The computer program product of claim 19, further comprising the program instructions executable to:
   obtain, by the cognitive computing system, information about the historical activities and types of the historical activities; and
   create, by the cognitive computing system, the knowledge corpus, based on the information about the historical activities and classification of the historical activities.

* * * * *